(No Model.)

C. L. MOREHOUSE.
CAR TRUCK.

No. 320,156. Patented June 16, 1885.

WITNESSES:
Theo. G. Hoster
C. Sedgwick

INVENTOR:
C. L. Morehouse
BY Munn & Co.
ATTORNEYS.

United States Patent Office.

CHARLES L. MOREHOUSE, OF BROOKLYN, NEW YORK.

CAR-TRUCK.

SPECIFICATION forming part of Letters Patent No. 320,156, dated June 16, 1885.

Application filed October 10, 1884. (No model.)

*To all whom it may concern:*

Be it known that I, CHARLES L. MOREHOUSE, of Brooklyn, in the county of Kings and State of New York, have invented a new and Improved Anti-Friction and Curve-Truck for Railway-Cars, of which the following is a full, clear, and exact description.

The object of my invention is to provide a new and improved anti-friction railway-truck which is so constructed as to turn curves with great facility and without the slipping of wheels.

The invention consists in the combination, with a car-truck frame, of short axles journaled in the side bars, flanged wheels on the axles, shafts journaled on the side bars above and at each side of each axle, and of friction-wheels mounted on the ends of the upper shaft and resting against the axles of the flanged wheels.

Reference is to be had to the accompanying drawings, forming part of this specification, in which similar letters of reference indicate corresponding parts in both the figures.

Figure 1:
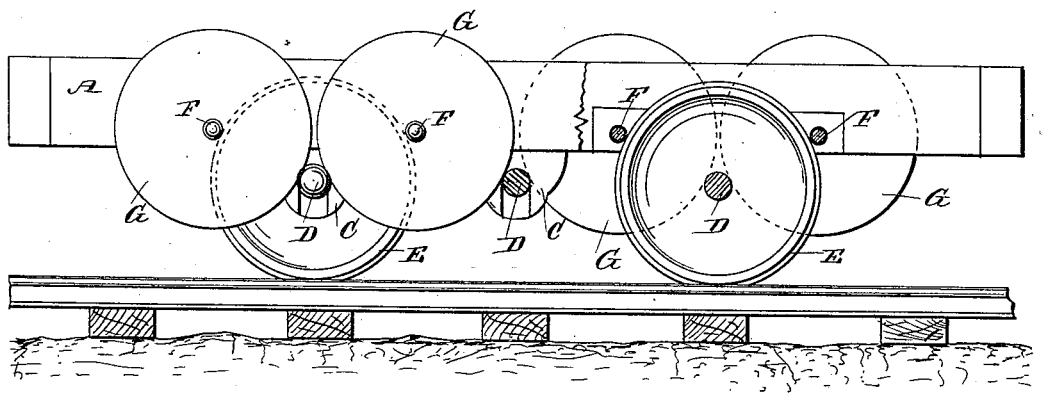
Figure 2:
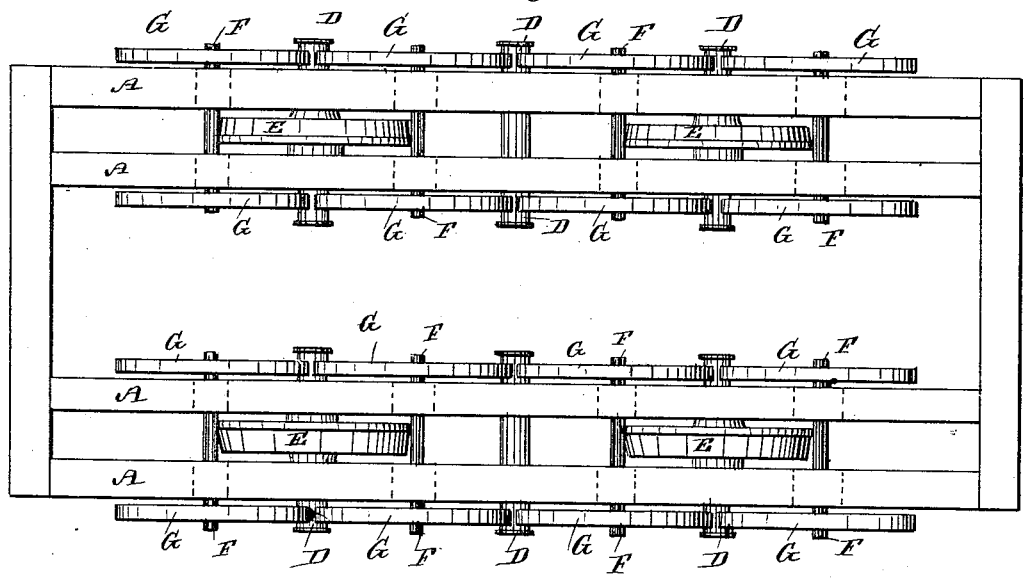

Figure 1 is a longitudinal elevation of my improved car-truck, parts being broken out, and others in section. Fig. 2 is a plan view of the same.

The truck-frame is constructed with two parallel side bars, A, at each side, from the bottom edges of which bars the boxes C project, in which the ends of short shafts D are journaled, on which the usual flanged car-wheels, E, are mounted, the said wheels being located between the bars A.

At each side of each axle or shaft D a transverse shaft, F, is journaled in the bars A, parallel with and a short distance above the corresponding shaft or axle, and on each end of each shaft F a friction-wheel, G, is mounted, which friction-wheels are in contact with those parts of the corresponding axle or shaft, D, projecting from the bars. Four wheels, G, are in contact with each shaft or axle D, and as there are four of these axles D on the truck, there will be sixteen wheels G on the track, or four on the outer and on the inner side of each pair of bars A.

In case the truck is to have six wheels E, the middle axles, D, are arranged between the middle wheels, G. The boxes C only serve to hold the axles or shafts D in place. The wheels G are revolved from the ends of the shafts or axles D, and revolve with about one-sixteenth of the velocity of the wheels E.

The friction surface is thus enlarged and the speed of revolution decreased, and necessarily the friction is reduced.

As each wheel E is independent of the other, curves can be turned readily and none of the wheels slip.

Having thus described my invention, what I claim as new, and desire to secure by Letters Patent, is—

1. The combination, with a car-truck frame having two parallel bars at each side, of axles or shafts held in boxes on the said bars, flanged wheels mounted on the axles and located between the bars, and of two additional shafts journaled in the side bars, one at each side of each axle, carrying the flanged wheels above them, and of a wheel on said additional shaft, the said additional wheels being in contact with the opposite sides of the axles carrying the flanged wheels, substantially as herein shown and described.

2. In a car-truck, the combination, with the two pairs of parallel side bars, A, of three axles, D, held in each pair of bars A, flanged wheels E, shafts F, and the friction-wheels G, mounted on the same at the sides of the outer surface of the bars A, substantially as herein shown and described.

CHARLES L. MOREHOUSE.

Witnesses:
OSCAR F. GUNZ,
C. SEDGWICK.